Patented Aug. 2, 1932

1,869,734

UNITED STATES PATENT OFFICE

JEAN BAER, OF BASEL, SWITZERLAND

MANUFACTURE OF ELASTIC-PLASTIC MATERIAL

No Drawing. Application filed June 16, 1930, Serial No. 461,640, and in Germany June 24, 1929.

In my Austrian Patent No. 112,645 and in my Swiss Patents No. 127,540, No. 132,505, No. 132,507, No. 132,508, No. 132,510, No. 132,511 and No. 132,512, I have described processes in which elastic caoutchouc-like bodies are obtained by causing alkali- or earthalkali polysulphides in solution to act upon ethylene chloride or other halogenized hydrocarbons of the group $C_nH_{2n+2}$, the resulting body being soluble in carbon disulphide ($CS_2$).

It has now been found that if such a carbon disulphide solution is mixed at ordinary temperature with natural caoutchouc sap (latex) an intimate combination between the natural product and the artificial product is obtained and that it is possible in this way to add any proportion of natural caoutchouc to the artificial product in the cold.

*Example*

100 parts by weight of the elastic caoutchouc like product obtained according to any one of the above said specifications by the reaction of an alkali- or earthalkali polysulphide in solution with ethylene dichloride, ethylene dibromide, methylene dichloride, methylene dibromide, etc. are dissolved in about 150 parts by weight of carbon disulphide. The resulting viscose solution is mixed with 20 parts by weight of rubber latex, when a whitish-yellow pasty mass is immediately obtained, which after evaporation of the carbon disulphide is extremely tenacious and elastic. This mixture is adapted for cold vulcanization.

What I claim is:—

1. A process for producing an elastic-plastic body from a mixture of caoutchouc with the polymerization product of halogenized hydrocarbons of the $C_2H_{2n+2}$ group and a material selected from a group consisting of alkali and alkali earth polysulphides, consisting in dissolving said polymerization product in carbon disulphide and mixing the solution thus obtained and rubber latex.

2. A process for producing an elastic-plastic body from a mixture of caoutchouc with the polymerization product of ethylene dichloride and an alkali polysulphide, consisting in dissolving said polymerization product in carbon disulphide and mixing the solution thus obtained with rubber latex.

In witness whereof I have hereunto signed my name this 6th day of June 1930.

JEAN BAER.